United States Patent
Da Silva et al.

(10) Patent No.: US 10,144,525 B2
(45) Date of Patent: Dec. 4, 2018

(54) AIRCRAFT ENGINE PYLON TO WING MOUNTING ASSEMBLY

(71) Applicant: EMBRAER S.A., São José dos Campos, São Paulo (BR)

(72) Inventors: Julio Antonio Beltrami Da Silva, São Paulo (BR); Clovis Augusto Eça Ferreira, São Paulo (BR); Wanderley Montoro, São Paulo (BR); Alberto Dei Castelli, São Paulo (BR); José Darci Flor, Jr., São Paulo (BR); Marcelo Nogueira, São Paulo (BR); Cleber Soares, São Paulo (BR)

(73) Assignee: EMBRAER S.A., São José Dos Campos-SP (BR)

( * ) Notice: Subject to any disclaimer, the term of this patent is extended or adjusted under 35 U.S.C. 154(b) by 44 days.

(21) Appl. No.: 14/863,941

(22) Filed: Sep. 24, 2015

(65) Prior Publication Data

US 2017/0088278 A1  Mar. 30, 2017

(51) Int. Cl.
*B64C 27/26* (2006.01)
*B64D 27/26* (2006.01)
*B64D 27/18* (2006.01)

(52) U.S. Cl.
CPC ............ *B64D 27/26* (2013.01); *B64D 27/18* (2013.01); *B64D 2027/264* (2013.01)

(58) Field of Classification Search
CPC ........ B64D 27/00; B64D 27/02; B64D 27/26; B64D 2027/262; B64D 2027/264; F02C 1/00; F02C 7/20
See application file for complete search history.

(56) References Cited

U.S. PATENT DOCUMENTS

| | | | | |
|---|---|---|---|---|
| 5,524,847 A | * | 6/1996 | Brodell | B64C 7/02 244/54 |
| 6,330,985 B1 | * | 12/2001 | Manteiga | B64D 27/18 244/54 |
| 2005/0274485 A1 | * | 12/2005 | Huggins | B22C 9/22 164/349 |
| 2007/0205324 A1 | | 9/2007 | Diochon | |
| 2009/0309005 A1 | * | 12/2009 | Foster | B64D 27/26 248/554 |
| 2010/0193627 A1 | * | 8/2010 | Lafont | B64D 27/18 244/54 |

(Continued)

FOREIGN PATENT DOCUMENTS

| | | | | |
|---|---|---|---|---|
| CA | 2800464 A1 | * | 6/2013 | F02C 3/107 |
| FR | 3025782 A1 | * | 3/2016 | B64D 27/26 |

*Primary Examiner* — Joseph W Sanderson
*Assistant Examiner* — Aaron M Rodziwicz
(74) *Attorney, Agent, or Firm* — Nixon & Vanderhye P.C.

(57) ABSTRACT

Pylon mounting assemblies are provided for mounting an engine (e.g., a turbojet engine) to a wing of an aircraft. The pylon mounting assemblies include an upper pylon connection member, and a lower pylon connection box, wherein the upper pylon connection member and the lower pylon connection box respectively include multiple opposed pairs of connection lobes. At least one pair of the connection lobes includes a pin connection to restrict degrees of freedom thereat along an x-axis and a mutually perpendicular z-axis, while at least one other pair of connection lobes includes a connection rod to restrict degrees of freedom thereat along the z-axis.

10 Claims, 4 Drawing Sheets

(56) References Cited

U.S. PATENT DOCUMENTS

| | | | | |
|---|---|---|---|---|
| 2014/0191080 A1* | 7/2014 | Surply | ............... | B64C 7/02 |
| | | | | 244/54 |
| 2015/0013142 A1* | 1/2015 | West | ............... | B64D 27/18 |
| | | | | 29/525.08 |
| 2015/0048202 A1* | 2/2015 | Takeuchi | ............... | F02C 7/25 |
| | | | | 244/54 |
| 2015/0144732 A1* | 5/2015 | Peyruseigt | ............... | B64C 1/0009 |
| | | | | 244/54 |
| 2015/0336678 A1* | 11/2015 | Cassagne | ............... | B64D 27/26 |
| | | | | 244/54 |
| 2016/0368611 A1* | 12/2016 | Castelli | ............... | B64D 27/26 |

\* cited by examiner

AIRCRAFT ENGINE PYLON TO WING MOUNTING ASSEMBLY

CROSS-REFERENCE TO RELATED APPLICATION

This application may be deemed related to commonly owned U.S. application Ser. No. 14/863,989 filed on Sep. 24, 2015 (now U.S. Pat. No. 9,868,539), the entire content of which is expressly incorporated hereinto by reference.

FIELD

The embodiments disclosed herein relate generally to assemblies to attach an aircraft engine (e.g., a turbojet engine) to the underside of an aircraft wing by way of an engine mounting pylon.

BACKGROUND

In order to achieve design goals related to reduction of fuel consumption with its associated advantages of thereby reducing emissions of air pollutants and noise, there is a trend in the commercial aviation industry towards the adoption of turbojet engines having improved design criteria. These new generation turbojet (turbofan) engines are however larger and thus heavier than the existing engine models. On the other hand, newly designed wings are being proposed to match the new generation engines with the ultimate goal of achieving further fuel savings, i.e., wings that sustain lower induced drag due to a larger aspect ratio. These new larger aspect ratio wings however exhibit a characteristic that leads to smaller cross sections with reduced stiffness. Both of these factors contribute to the aeroelastic requirements becoming more critical than for the existing generation of commercial jets.

Taking into account the relatively larger weight and size of the new generation of turbojet engines and the fact that they will be installed under the newly designed wings with larger aspect ratio and thus smaller cross sections, the aeroelastic viability thereby becomes highly dependent on the design of the attachment assemblies to attach the engine mounting pylon to the underside of the wing. The existing solutions for the pylon-to-wing attachment cannot provide an appropriate stiffness for the new mass and geometric characteristics of the newer generation of larger turbojet engines that will readily satisfy flutter certification requirements, particularly when the engine pitch mechanisms are critical to ensure proper engine operation.

Thus, if current pylon-to-wing attachment assemblies are to be adopted for the new generation of turbojet engines, it will become necessary to either increase the structural weight of the wing box or change the wing box construction materials (e.g., from traditional metallic alloys to stiffer and more expensive alternatives such as composite systems).

Therefore, what is needed in this art are turbojet engine pylon-to-wing mounting assemblies that will provide sufficient stiffness requirements to accommodate both the new generation of heavier turbojet engines and the larger aspect ratio (smaller cross-section) aircraft wings. It is towards providing such a solution that the embodiments of the invention disclosed herein are directed.

SUMMARY

According to the embodiments disclosed herein, pylon mounting assemblies are provided for mounting an engine to a wing of an aircraft which include an upper pylon connection member, and a lower pylon connection box, wherein the upper pylon connection member and the lower pylon connection box respectively include multiple opposed pairs of connection lobes. At least one pair of the connection lobes includes a pin connection to restrict degrees of freedom thereat along an x-axis and a mutually perpendicular z-axis, while at least one other pair of connection lobes includes a connection rod to restrict degrees of freedom thereat along the z-axis.

The multiple opposed pairs of connection lobes may include forward, intermediate and rearward pairs of connection lobes. According to some embodiments, the forward and rearward pairs of connection lobes include respective connection rods to restrict degrees of freedom thereat along the z-axis, and the intermediate pair of connection lobes includes a pin connection to restrict degrees of freedom thereat along the x-axis and the mutually perpendicular z-axis.

Other embodiments will include intermediate and rearward pairs of connection lobes interconnected by respective connection rods to restrict degrees of freedom thereat along the z-axis, and the forward pair of connection lobes includes a pin connection to restrict degrees of freedom thereat along the x-axis and the mutually perpendicular z-axis.

Still other embodiments will include forward and intermediate pairs of connection lobes include respective pin connections to restrict degrees of freedom thereat along the x-axis and the mutually perpendicular z-axis, and wherein rearward pair of connection lobes includes a connection rod to restrict degrees of freedom thereat along the z-axis.

The upper pylon connection member may be a solid structure connected rigidly to a wing box of the aircraft wing and extend forwardly of the wing box of the aircraft wing. According to some embodiments the forward connection lobe of the upper pylon connection member may extend forwardly of and be downwardly dog-legged relative to the wing box.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
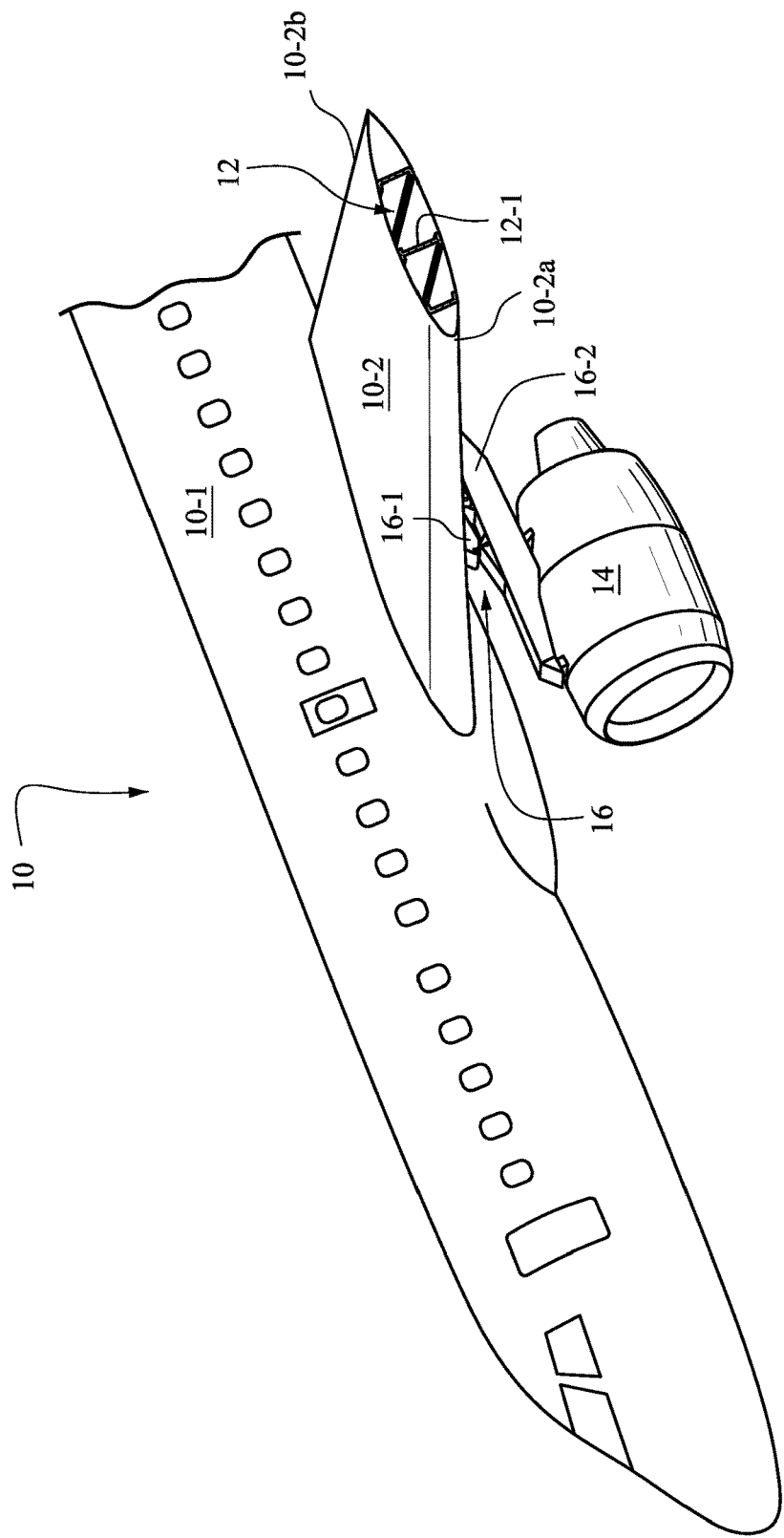
FIG. 1 is a front perspective bottom view of a typical aircraft engine and its associated mounting pylon according to an embodiment of the invention for mounting the engine to the aircraft's wing box structure.

Accompanying FIG. 1 depicts generally an aircraft 10 having a fuselage 10-1 and an exemplary wing 10-2 having leading and trailing edges 10-2a and 10-2b, respectively. The wing 10-2 is defined by a structural wing box 12 formed of wing spars 12-1 extending outwardly from the fuselage 10-1 and aerodynamically shaped rib elements 12-2 (see FIGS. 2-4). An exemplary turbojet engine 14 is shown attached to the underside of the wing 10-2 by way of a pylon mounting assembly 16 according to the invention. It will of course be understood that only the port side wing 10-2 and port side engine 14 are shown in FIG. 1 but are exemplary to the starboard side wing and engine that are not depicted therein. Thus, the description which follows applies equally to both wings and engines of the aircraft 10.

Figure 2:
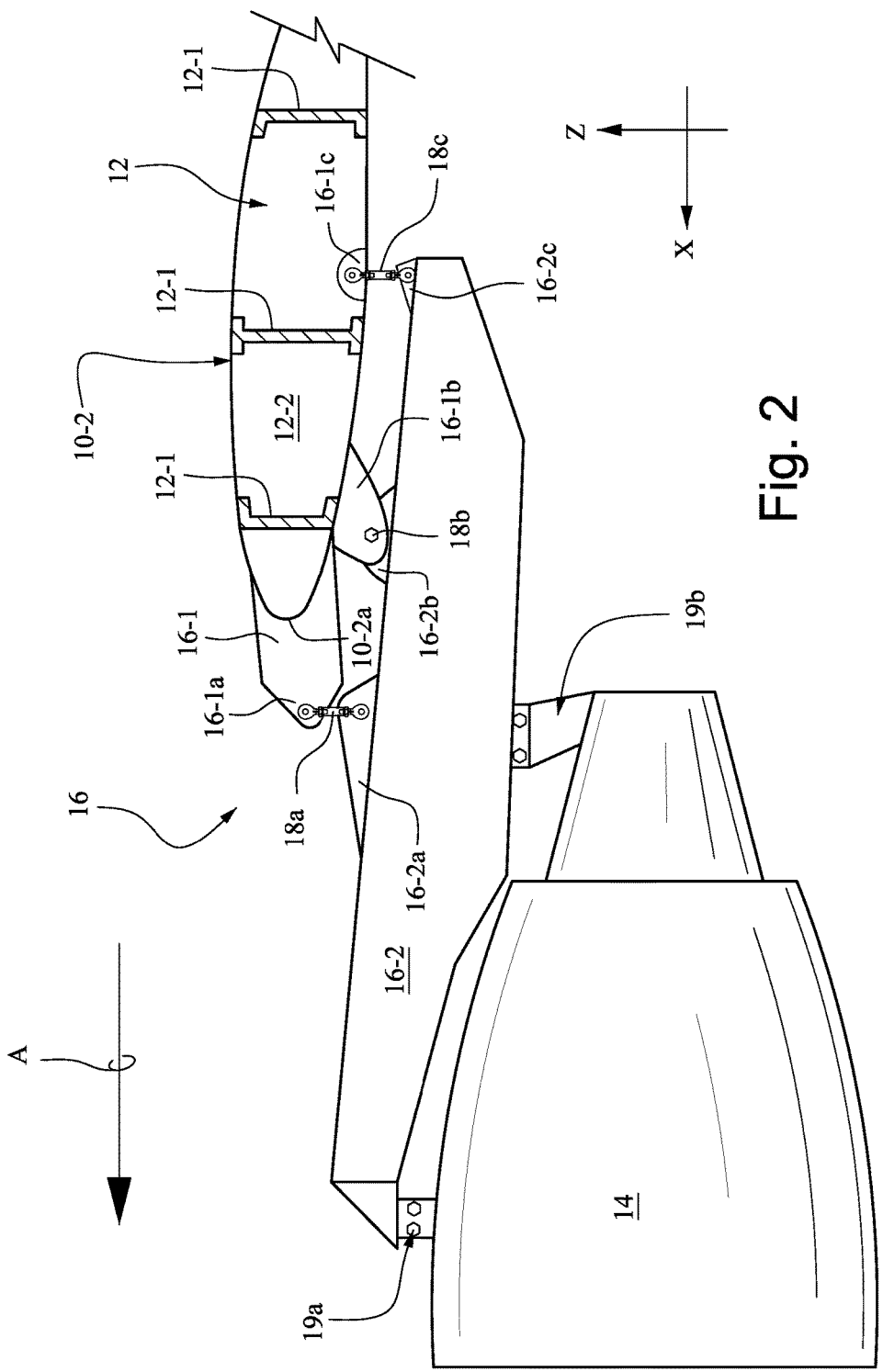
FIG. 2 is an enlarged side elevational view of one embodiment of the aircraft engine wing-mounting pylon depicted in FIG. 1.

FIG. 2 shows one embodiment for mounting of the aircraft turbojet engine 14 to the wing box 12 of the aircraft wing 10-2 by way of the pylon mounting assembly 16 according to the invention in greater detail. As is shown, the pylon mounting assembly 16 is comprised of an upper pylon connection member 16-1 and a lower pylon box structure 16-2 connected to one another by the connector assembly 18a. The upper pylon connection member 16-1 is most preferably a solid structure (i.e., a solid mass of lightweight metal alloy) attached rigidly to and extending forwardly of the wing box 12 to thereby extend forwardly of the leading edge 10-2a of the wing 10-2 along an elongate axis of the lower pylon box structure 16-2 relative to the aircraft's travel direction (noted by arrow A in FIGS. 2-4). The lower pylon box structure 16-2 is however preferably formed of interconnected lattice structure of individual longitudinal and latitudinal support members (not shown). In the interests of improved aerodynamics, both the upper pylon connection member 16-1 and the lower pylon box structure 16-2 may be covered by a suitable skin structure (not shown), e.g., aluminum alloy sheet.

A connection lobe 16-1a forwardly extends from a terminal end of the upper pylon connection member 16-1. In the embodiment depicted, the connection lobe 16-1a is generally a forwardly V-shaped forward extension of the upper pylon connection member 16-1. The wing box 12 is provided with intermediate and a rearward connection lobes 16-1b and 16-1c, respectively. The lower pylon box structure 16-2 includes a series of connection lobes including a forward connection lobe 16-2a, an intermediate connection lobe 16-2b and a rearward extension lobe 16-2c. It will be observed that the lower pylon box structure 16-2 includes a rearward end section which extends below the wing box 12 so that the wing box 12 and the rearward end of the pylon box structure may be connected together at the opposed pair of rearward lobes 16-1c, 16-2c. The forward end section of the pylon box structure 16-2 extends forwardly of the upper pylon connection member 16-1 so as to accommodate the engine 14. The engine 14 is dependently connected to the bottom of the lower pylon box structure 16-2 by means of conventional forward and aft engine mounting devices 19a, 19b, respectively.

The pairs of forward and rearward connection lobes 16-1a, 16-2a and 16-1c, 16-2c are connected together by linkage rods 18a and 18c, respectively. The linkage rods 18a, 18c thereby restrict the degrees of freedom for each such pairs of forward and rearward connection lobes 16-1a, 16-2a and 16-1c, 16-2c in the z direction (i.e., an upward direction perpendicular to the travel direction of the aircraft (arrow A). The pair of intermediate lobes 16-1b, 16-2b however are connected together by a connection pin 18b which restricts the degree of freedom thereat along both the x direction (parallel to the travel direction of arrow A) and the z direction (upwardly perpendicular to the travel direction of arrow A). These connections thereby serve to provide adequate stiffness for mounting of the engine 14 to satisfy flutter requirements, particularly for engine pitch mechanisms.

In order to meet crashworthiness certification requirements, the various connection pins and connection rods may be provided with conventional fuse pins (rupture pins) to break away in the event that an excessive separatory force is encountered. In the embodiment according to FIG. 2, the connection pin 18b is a fuse pin (rupture pin), the linkage rod 18a has a fuse pin (rupture pin) at its lower end which is connected to the lobe 16-2a and the linkage rod 18c has a fuse pin (rupture pin) at its lower end which is connected to the lobe 16-2c.

Figure 3:
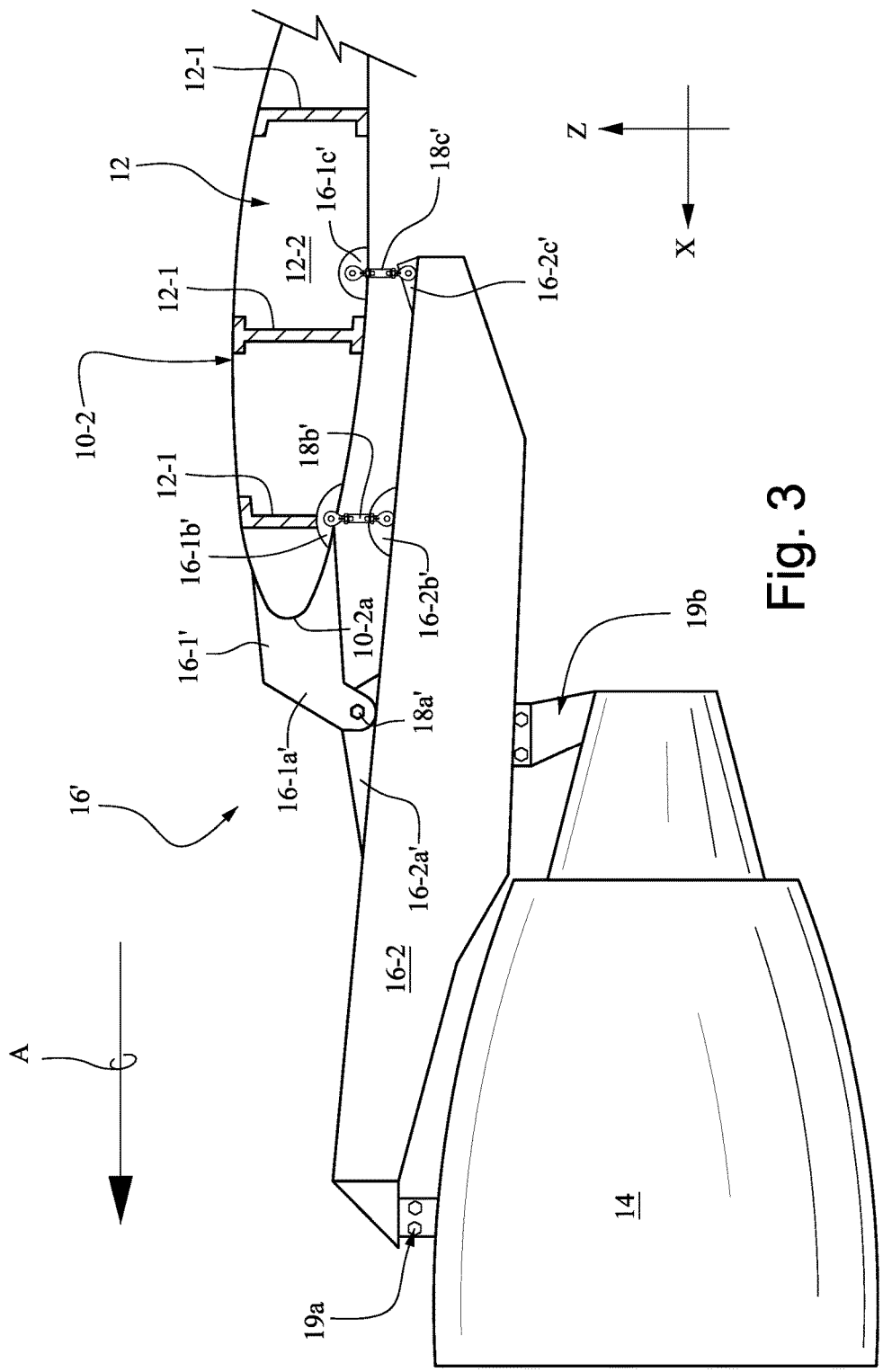
FIG. 3 is an enlarged side elevational view of another embodiment of the aircraft engine wing-mounting pylon depicted in FIG. 1.

An alternative embodiment of for mounting of the aircraft turbojet engine 14 to the wing box 12 of the aircraft wing 10-2 by way of a pylon mounting assembly 16' according to the invention is shown in accompanying FIG. 3 in greater detail. In this regard, structures that are similar to those depicted in FIG. 2 have been shown in FIG. 3 with the same reference numeral but with a prime (') designator. It will be noted that, like the upper pylon connection member 16-1 of assembly 16, the upper pylon connection member 16-1' of assembly 16' is likewise most preferably a solid structure (i.e., a solid mass of lightweight metal alloy) attached rigidly to and extending forwardly of the wing box 12 relative to the aircraft's travel direction (noted by arrow A). In the interests of improved aerodynamics, both the upper pylon connection member 16-1' and the lower pylon box structure 16-2 may be covered by a suitable skin structure (not shown), e.g., aluminum alloy sheet.

The upper pylon connection member 16-1' includes a forwardly extending and downwardly dog-legged connection lobe 16-1a'. The wing box 12 is provided with intermediate and a rearward connection lobes 16-1b' and 16-1c', respectively. The lower pylon box structure 16-2 includes a series of connection lobes including a forward connection lobe 16-2a', an intermediate connection lobe 16-2b' and a rearward extension lobe 16-2c'. It will be observed that the lower pylon box structure 16-2 includes a rearward end section which extends below the wing box 12 so that the wing box 12 and the rearward end of the pylon box structure may be connected together at the opposed pair of rearward lobes 16-1c', 16-2c'. The forward end section of the pylon box structure 16-2 extends forwardly of the upper pylon connection member 16-1' so as to accommodate the engine 14.

According to the embodiment of the pylon connection assembly 16' depicted in FIG. 3, the pairs of intermediate and rearward connection lobes 16-1b', 16-2b' and 16-1c', 16-2c' are connected together by linkage rods 18b' and 18c', respectively. The linkage rods 18b', 18c' thereby restrict the degrees of freedom for each such pairs of forward and rearward connection lobes 16-1b', 16-2b' and 16-1c', 16-2c' in the z direction (i.e., an upward direction perpendicular to the travel direction of the aircraft (arrow A). The pair of forward lobes 16-1a', 16-2a' however are connected together by a connection pin 18a' which restricts the degree of freedom thereat along both the x direction (parallel to the travel direction of arrow A) and the z direction (upwardly perpendicular to the travel direction of arrow A).

In order to meet crashworthiness certification requirements, the various connection pins and connection rods may be provided with conventional fuse pins (rupture pins) to break away in the event that an excessive separatory force is encountered. In the embodiment according to FIG. 3, the connection pin 18a' is a fuse pin (rupture pin), the linkage rod 18b' has a fuse pin (rupture pin) at its lower end which is connected to the lobe 16-2*b*' and the linkage rod 18*c*' has a fuse pin (rupture pin) at its lower end which is connected to the lobe 16-2*c*'.

Figure 4:
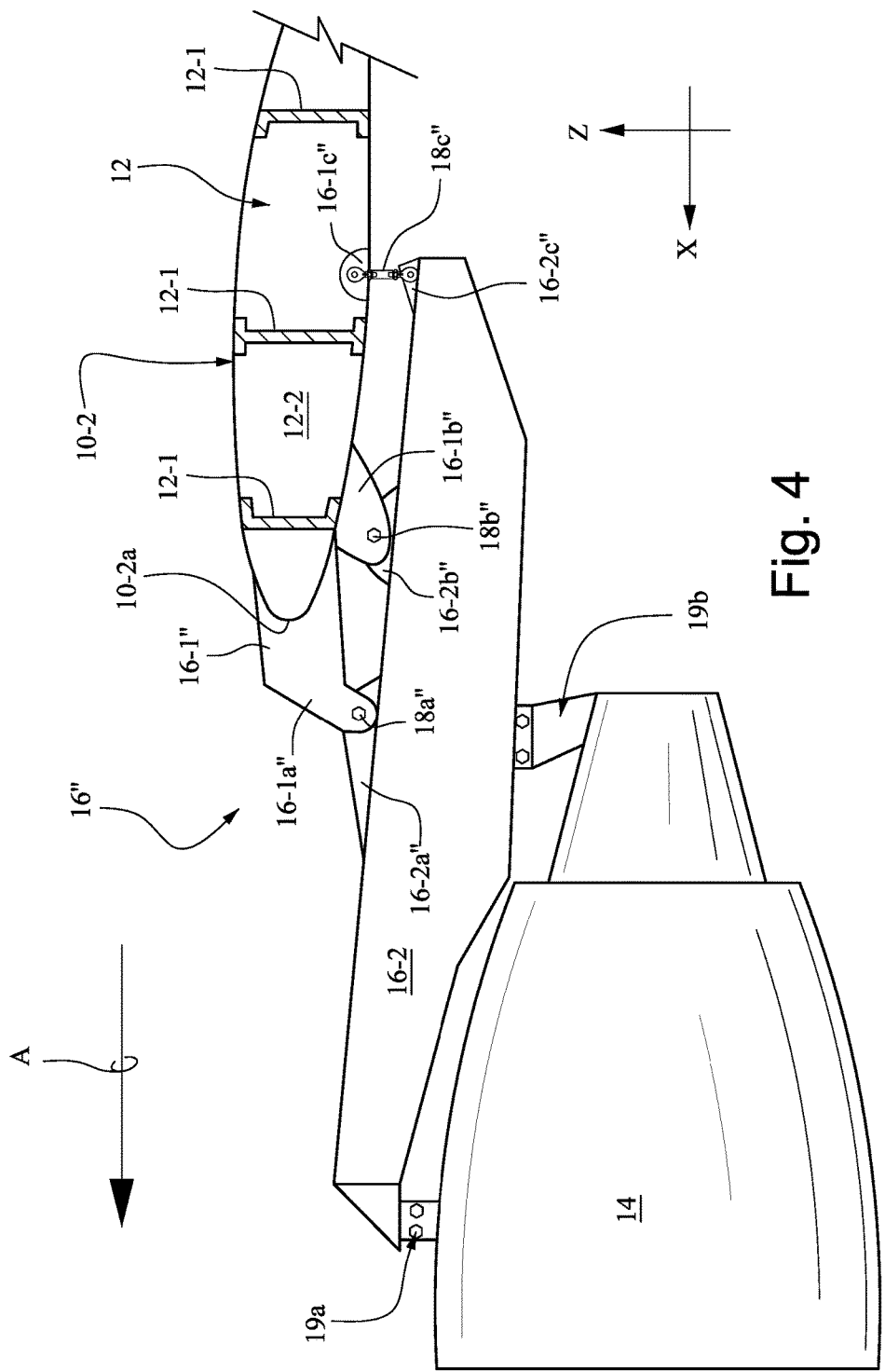
FIG. 4 is an enlarged side elevational view of yet another embodiment of the aircraft engine wing-mounting pylon depicted in FIG. 1.

A further alternative embodiment of for mounting of the aircraft turbojet engine 14 to the wing box 12 of the aircraft wing 10-2 by way of a pylon mounting assembly 16" according to the invention is shown in accompanying FIG. 4 in greater detail. In this regard, it will be observed that structures that are similar to those depicted in FIG. 2 or 3 have been shown in FIG. 4 with the same reference numeral but with a double prime (") designator.

It will be noted that, like the upper pylon connection members 16-1 and 16-1' of assemblies 16 and 16', respectively, the upper pylon connection member 16-1" of assembly 16" is likewise most preferably a solid structure (i.e., a solid mass of lightweight metal alloy) attached rigidly to and extending forwardly of the wing box 12 relative to the aircraft's travel direction (noted by arrow A). In the interests of improved aerodynamics, both the upper pylon connection member 16-1" and the lower pylon box structure 16-2 may be covered by a suitable skin structure (not shown), e.g., aluminum alloy sheet.

The upper pylon connection member 16-1" includes a forwardly extending and downwardly dog-legged connection lobe 16-1*a*". The wing box 12 is provided with intermediate and a rearward connection lobes 16-1*b*" and 16-1*c*", respectively. The lower pylon box structure 16-2 includes a series of connection lobes including a forward connection lobe 16-2*a*", an intermediate connection lobe 16-2*b*" and a rearward extension lobe 16-2*c*". It will be observed that the lower pylon box structure 16-2 includes a rearward end section which extends below the wing box 12 so that the wing box 12 and the rearward end of the pylon box structure may be connected together at the opposed pair of rearward lobes 16-1*c*", 16-2*c*". The forward end section of the pylon box structure 16-2 extends forwardly of the upper pylon connection member 16-1" so as to accommodate the engine 14.

According to the embodiment of the pylon connection assembly 16" depicted in FIG. 4, the pair of rearward connection lobes 16-1*c*", 16-2*c*" is connected together by a linkage rods 18*c*". The linkage rod 18*c*" thereby restricts the degrees of freedom for the pair of rearward connection lobes 16-1*c*", 16-2*c*" in the z direction (i.e., an upward direction perpendicular to the travel direction of the aircraft (arrow A). However, the pairs of forward and intermediate lobes 16-1*a*", 16-2*a*" and 16-1*b*", 16-2*b*" are connected together by connection pin 18*a*", 18*b*", respectively, which restrict the degrees of freedom thereat along both the x direction (parallel to the travel direction of arrow A) and the z direction (upwardly perpendicular to the travel direction of arrow A).

In order to meet crashworthiness certification requirements, the various connection pins and connection rods may be provided with conventional fuse pins (rupture pins) to break away in the event that an excessive separatory force is encountered. In the embodiment according to FIG. 4, the connection pin 18*a*" is a fuse pin (rupture pin), the connection pin 18*b*" is a fuse pin (rupture pin) and the linkage rod 18*c*" has a fuse pin (rupture pin) at its lower end which is connected to the lobe 16-2*c*".

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft wing assembly comprising an aircraft wing having leading and trailing edges and a pylon mounting assembly for mounting an engine to the aircraft wing, wherein the pylon mounting assembly comprises:
    an upper pylon connection member which extends forwardly of the leading edge of the aircraft wing relative to an aircraft travel direction, and
    a lower pylon connection box having an elongate axis along the aircraft travel direction, wherein
    the upper pylon connection member and the lower pylon connection box respectively include at least opposed forward and rearward pairs of upper and lower connection lobes, respectively, each being aligned with the elongate axis of the lower pylon connection box; and wherein
    the upper forward connection lobe of the upper pylon connection member is positioned at and extends forwardly of a terminal end of the upper pylon connection member; and wherein
    the lower forward connection lobe of the lower pylon connection member extends upwardly from the lower pylon connection member; and wherein
    at least a first one of the forward and rearward pairs of connection lobes includes a pin connection to restrict degrees of freedom thereat along an x-axis and a mutually perpendicular z-axis, and wherein
    at least a second one of the forward and rearward pairs of connection lobes includes a connection rod to restrict degrees of freedom thereat along the z-axis, wherein
    each of the pin connection and the connection rod comprises a fuse pin capable of rupturing and breaking away in response to a separatory force exceeding a nominal design force to thereby allow separation of the lower pylon connection box from the upper pylon connection member.

2. The aircraft wing assembly as in claim 1, wherein the upper pylon connection member is a solid structure connected rigidly to a wing box of the aircraft wing.

3. The aircraft wing assembly as in claim 2, wherein the forward connection lobe of the upper pylon connection member extends forwardly of and is downwardly dog-legged relative to the leading edge of the aircraft wing.

4. The aircraft wing assembly as in claim 1, with wherein the multiple opposed pairs of connection lobes includes forward, intermediate and rearward pairs of connection lobes.

5. The aircraft wing assembly as in claim 1, wherein the forward and rearward pairs of connection lobes include respective connection rods to restrict degrees of freedom thereat along the z-axis, and the intermediate pair of connection lobes includes a pin connection to restrict degrees of freedom thereat along the x-axis and the mutually perpendicular z-axis.

6. The aircraft wing assembly as in claim 1, wherein the intermediate and rearward pairs of connection lobes include respective connection rods to restrict degrees of freedom thereat along the z-axis, and the forward pair of connection lobes includes a pin connection to restrict degrees of freedom thereat along the x-axis and the mutually perpendicular z-axis.

7. The aircraft wing assembly as in claim 6, wherein the forward connection lobe of the upper pylon connection member extends forwardly of and is downwardly dog-legged relative to the leading edge of the aircraft wing.

8. The aircraft wing assembly as in claim 1, wherein the forward and intermediate pairs of connection lobes include respective pin connections to restrict degrees of freedom thereat along the x-axis and the mutually perpendicular z-axis, and wherein rearward pair of connection lobes includes a connection rod to restrict degrees of freedom thereat along the z-axis.

9. The aircraft wing assembly as in claim 8, wherein the forward connection lobe of the upper pylon connection member extends forwardly of and is downwardly dog-legged relative to the leading edge of the aircraft wing.

10. An aircraft comprising the aircraft wing assembly as in claim 1.

* * * * *

UNITED STATES PATENT AND TRADEMARK OFFICE
CERTIFICATE OF CORRECTION

PATENT NO. : 10,144,525 B2
APPLICATION NO. : 14/863941
DATED : December 4, 2018
INVENTOR(S) : Da Silva et al.

Page 1 of 1

It is certified that error appears in the above-identified patent and that said Letters Patent is hereby corrected as shown below:

On the Title Page

(72) Inventors should read:
Julio Antonio Beltrami DA SILVA, São Paulo (BR);
Clovis Augusto Eça FERREIRA, São Paulo (BR);
Wanderley MONTORO, São José Paulo (BR);
Alberto Dei CASTELLI, São Paulo (BR);
José Darci Flor JUNIOR, São Paulo (BR);
Marcelo NOGUEIRA, São Paulo (BR);
Cleber SOARES, São Paulo (BR)

Signed and Sealed this
Twenty-eighth Day of January, 2020

Andrei Iancu
*Director of the United States Patent and Trademark Office*